July 31, 1956

C. M. WIIG 2,756,994

INTERMITTENT FEEDING AND CUTTING
MACHINE WITH VARIATING MEANS

Filed Oct. 19, 1953

Inventor.
Chester M. Wiig

By Wilkinson Huxley Byron & Hume
Attys.

July 31, 1956

C. M. WIIG 2,756,994

INTERMITTENT FEEDING AND CUTTING
MACHINE WITH VARIATING MEANS

Filed Oct. 19, 1953

Inventor.
Chester M. Wiig.

By Wilkinson Huxley Byron + Hume
Attys.

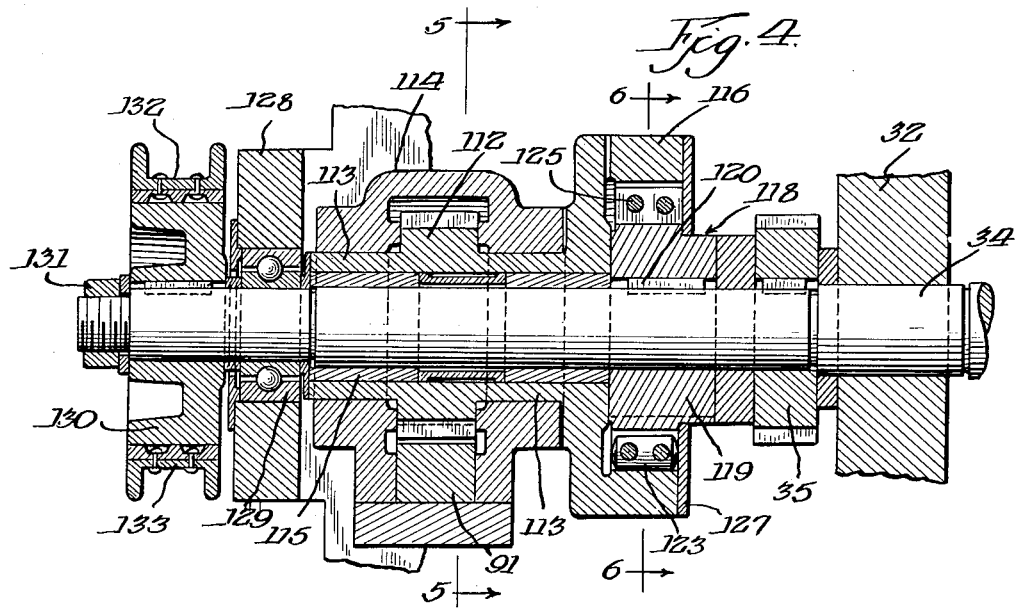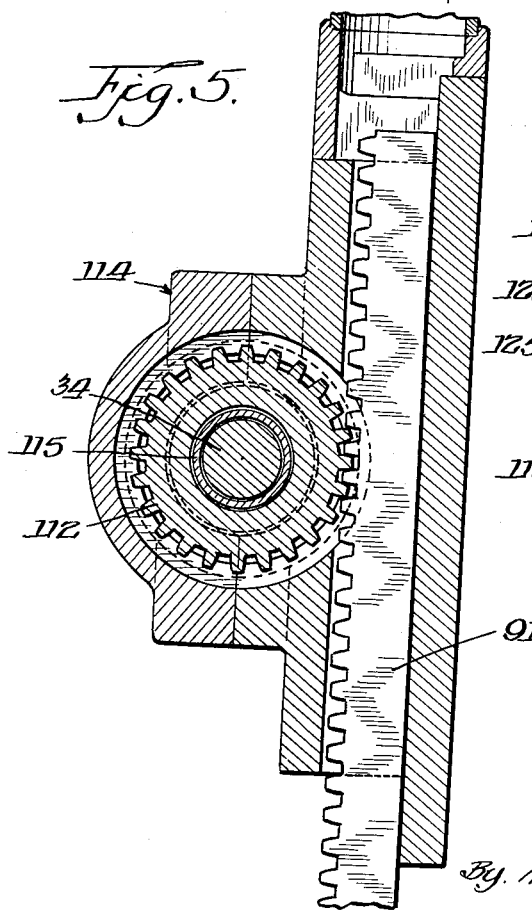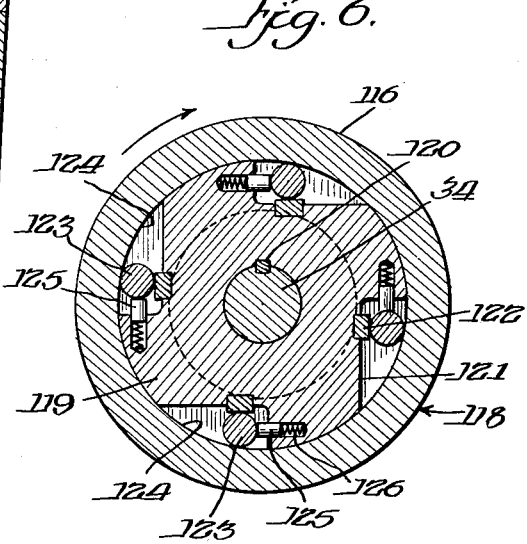

Inventor
Chester M. Wiig.
By Wilkinson Huxley Byron & Hume
Attys.

United States Patent Office 2,756,994
Patented July 31, 1956

2,756,994

INTERMITTENT FEEDING AND CUTTING MACHINE WITH VARIATING MEANS

Chester M. Wiig, Chicago, Ill., assignor to F. J. Littell Machine Company, Chicago, Ill., a corporation of Illinois Application October 19, 1953, Serial No. 386,843

3 Claims. (Cl. 271—2.4)

The invention relates to feeding mechanism for metal strip material and has reference in particular to a metal strip feeding and cutting machine incorporating a variating device for adjusting the feeding action on the strip material, and one of the main objects of the invention is to provide such a machine that can be adjusted during operation.

The machine selected for illustrating the invention is designed for cutting metal strip into sections of accurate lengths and which sections are cut transversely to form saw-tooth edges with each tooth simulating a truncated cone. The metal sections are employed by companies engaged in the manufacture of tin cans who stamp circular blanks from each metal section for the top and bottom portions of the cans. The circular blanks are cut from each metal so that the waste metal between blanks and at the transverse ends of the sections are held to a minimum. Thus, to attain maximum economy in the manufacture of the tin cans it is essential that the feeding and cutting machine incorporate variating means for adjusting the feeding action on the strip material.

The feeding of metal strip material in conventional feeding and cutting machines is performed by feed rolls which have intermittent rotation and which alternate in operation with that of the cutting die. Thus, the strip material is fed forwardly the desired length and is then cut transversely by the cutting die. It is necessary to make adjustments in the feeding action of the feed rolls for cutting metal sections of different lengths, and since the speed of the press and the gripping action of the feed rolls is variable, it is also necessary to vary their feeding action to adjust for these variables from time to time. For example, the feeding action on the material may be somewhat greater for a high speed machine than for a low speed machine.

In connection with the foregoing, an object of the invention is to provide variating means of improved design for incorporation in metal strip feeding and cutting machines which will not require stopping of the machine in order to adjust the feeding action of the rolls, but which, on the contrary, will provide a hand wheel conveniently accessible to the operator whereby minute adjustment of the variating means can be easily and quickly made.

Another object of the invention is to provide feed variating means for a feeding and cutting machine which will include an eccentric pivot for an oscillating member having connection with a rack which is reciprocated thereby, the connection between the rack and member also being adjustable for initially setting the stroke of the rack and the feed variating means providing for minute adjustments whereby a high degree of accuracy in the feeding can be secured.

Another object of the invention is to provide feed variating means for incorporation in a feeding and cutting device so that the length of strip material fed thereby can be controlled and adjusted within limits, and wherein said limits will be directly dependent on the setting of the reciprocating rack which basically determines the stroke of the rack and thus the extent of rotation for the feed rolls.

A further object resides in the provision of feeding mechanism for a feeding and cutting machine which will have a feeding action for two hundred and forty degrees of the cycle and a return stroke for the remaining one hundred and twenty degrees of the cycle. Thus the machine of the invention drives the feeding rolls relatively slow in a feeding direction to achieve maximum accuracy in the feed and compensates for the same by a quick return.

Another object of the invention resides in the provision of a feeding and cutting machine having improved feeding mechanism which will operate in a manner to feed for approximately two hundred and forty degrees of the cycle with a quick return for one hundred and twenty degrees, and wherein said feeding mechanism incorporates variating means capable of micrometer adjustments so that the feeding action may be varied to achieve maximum accuracy in the feeding lengths of the strip material.

With these and various other objects in view, the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 4 is a longitudinal sectional view of the rack and pinion housing showing the lower feed roll shaft, the friction brake, the rack and pinion, and the overrunning clutch in association therewith;

Figure 5 is a vertical sectional view taken substantially along line 5—5 of Figure 4 and showing the rack and pinion drive;

Figure 6 is a sectional view taken substantially along line 6—6 of Figure 4 and illustrating the construction of the overrunning clutch;

Figure 7:
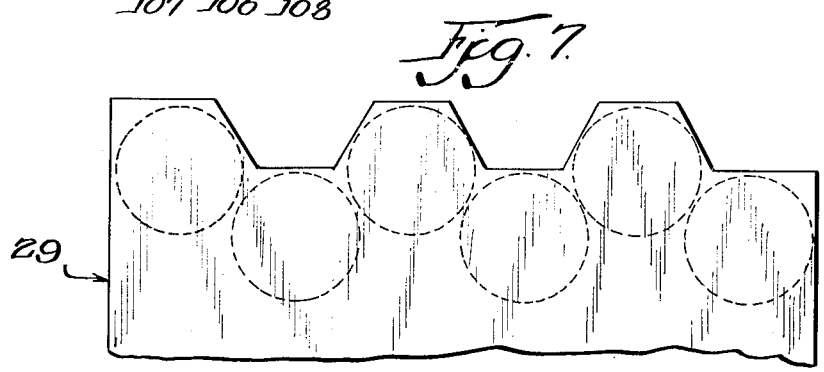
Figure 7 is a plan view showing the saw tooth formation of the transversely cut edge of a metal section such as may be produced by the machine of Figure 1.

The feeding and cutting machine selected for illustrating the present invention is generally conventional in design although incorporating improved feeding mechanism having associated therewith feed variating means to permit the operator to make minute adjustments in the length of the metal sections cut by the machine. Figure 7 illustrates the manner of stamping out the circular blanks from each metal section and it will be appreciated that in order to achieve maximum economy by keeping the waste material to a minimum, accurate control of the feeding action of the machine is essential. In the present invention this control is effectively obtained by the feed variating means which is combined with feeding mechanism which produces a feeding action for the major portion of the cycle with a quick return taking place for a minor portion of the cycle. The several improved features will be described in detail and their combined mode of operation will be fully explained as the description proceeds.

Figure 1:
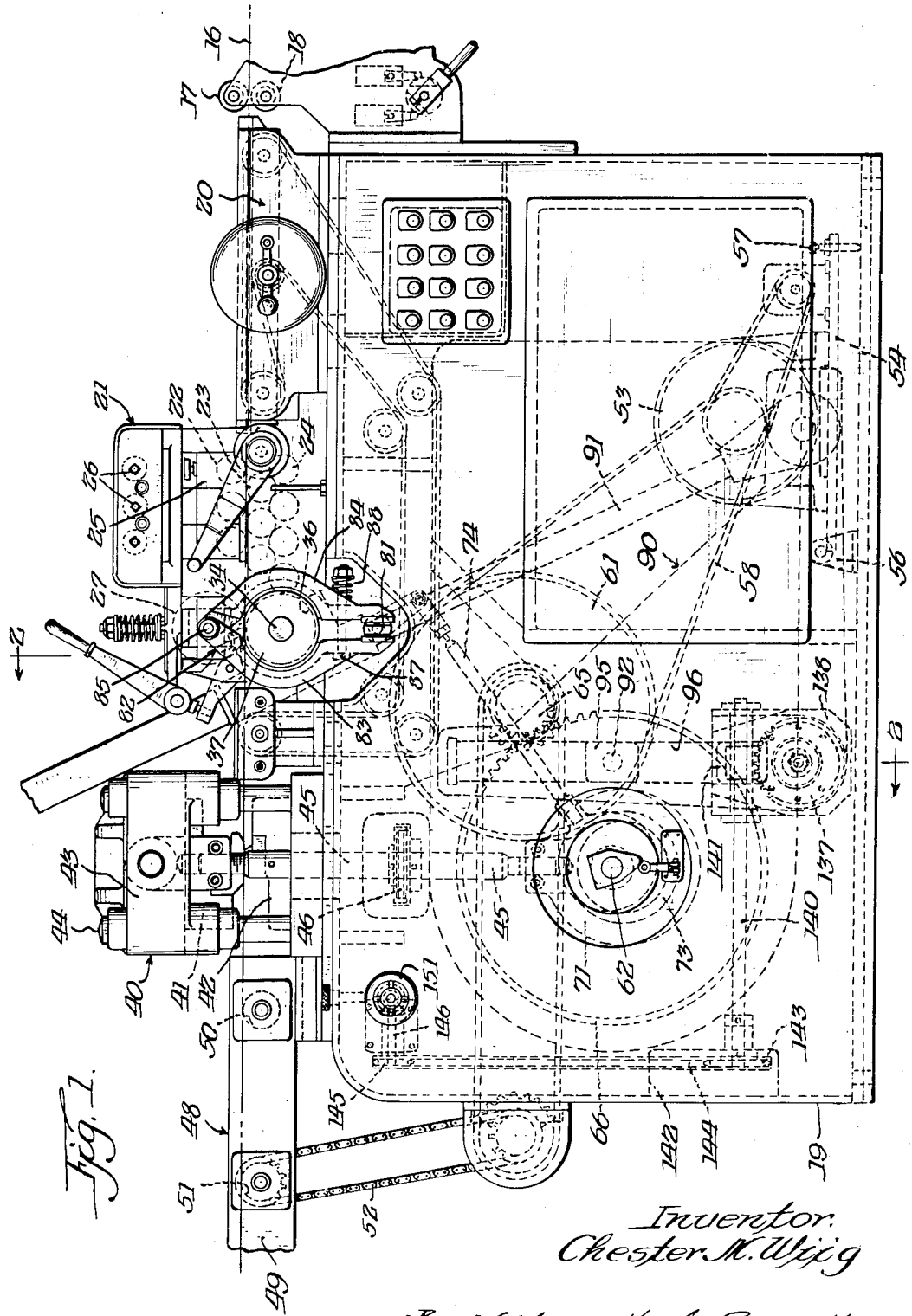
Figure 1 is an elevational view of the operator's side of a feeding and cutting machine having incorporated therein the improved feeding mechanism and feed variating means of the invention.
Figure 2:
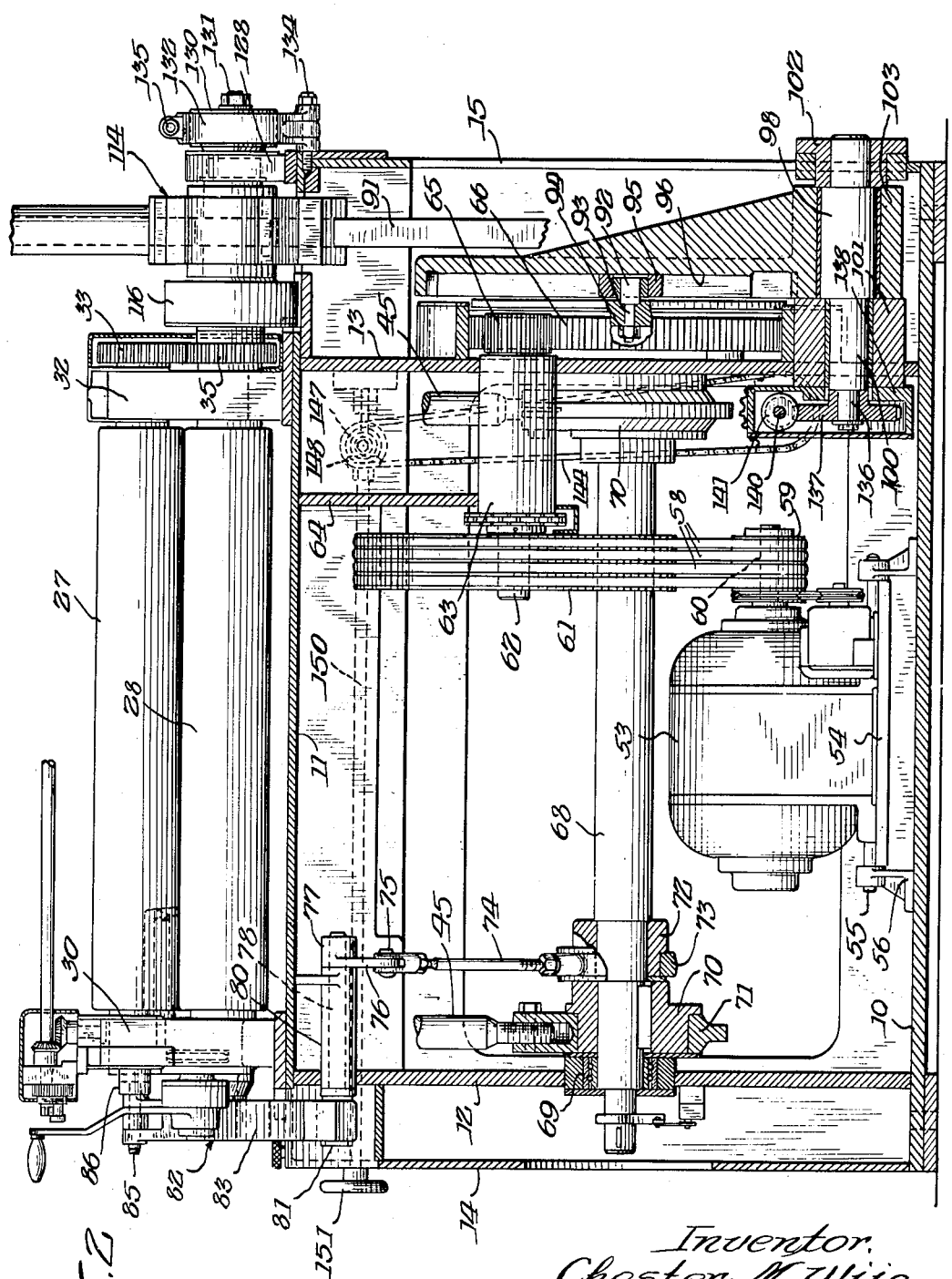
Figure 2 is a sectional view taken substantially along line 2—2 of Figure 1.

Referring more particularly to Figures 1 and 2, the frame structure for the present machine essentially consists of a base member 10, a top member 11, and side members 12 and 13, to which are applied outer side frames 14 and 15, respectively. The completed frame structure is substantially rectangular in shape with the feeding rolls and cutting dies being located on top member 11 and being supported thereby and with the side members 12 and 13 journalling the several shafts comprising the operative structure of the device.

The metal strip material such as 16 is fed to the machine at the right hand side thereof, Figure 1, said material entering between the initial guiding rollers 17 and 18. The structure indicated in its entirety by numeral 20 provides for lateral control of the metal strip material so that the same is properly positioned laterally of the machine when delivered to the straightening unit 21. Said straightening unit is suitably supported on the top member 11 of the frame structure and the same essentially consists of upper rollers such as 22 and lower rollers such as 23, the latter being geared to rotate in unison by the gear wheels 24. The upper rolls 22 of the straightening unit are each located centrally above a pair of lower rolls and in order to accomplish a straightening function the upper rolls are adjustably mounted, being journalled by the blocks 25 adapted to move vertically by means of threaded studs, not shown, but which can be rotated for adjustment purposes by the shafts 26. The metal strip material in passing through the straightening unit is bent in a direction opposite to the curvature assumed by the metal strip when in coil form. From the straightening unit the metal strip material passes through the main feeding rolls located between the straightening unit and the cutting die. The said feeding rolls, including the upper roll 27 and lower roll 28, are suitably mounted in side frames 30 and 32, Figure 2, the right hand end of the journalling shaft for feed roll 27 extending through side frame 32 and being provided with the driving gear 33. The lower feed roll 28 is journalled by the shaft 34, Figure 4, and this shaft extends through both side frames to project some distance beyond. At the right hand end, Figure 2, the extending end of shaft 34 is provided with gear 35, the same having meshing relation with gear 33 whereby rotation of the lower feed roll will effect rotation of the upper feed roll. The left hand extension of shaft 34 is provided with a gear 36, Figure 1, and which has meshing relation with one of the driving gear wheels 24 for operating the straightening unit. On the right hand end of shaft 34 there is mounted a brake drum 37 to which is applied brake arms to be presently described for frictionally braking the lower feed roll to prevent overrun of the strip material at the end of the feeding cycle.

From the main feeding rolls the strip material is presented to a cutting unit 40 consisting of an upper die 41 and a lower die 42. The upper die is movable in a vertical direction, being carried by member 43 mounted for vertical reciprocating movement by means of posts 44. The lower die 42 is stationary, being supported by the top member 11 of the frame structure. Cutting action on the strip material is effected by reciprocating the member 43, for which purpose a pair of actuating rods 45 are provided, being threadedly secured at their upper end to mmeber 43 on the respective sides of the same, and being actuated by eccentrics keyed to the main operating shaft of the machine, which structure will be presently described.

The pair of actuating rods 45 are connected by an endless chain 46 which passes over sprocket wheels fixed to each rod. The cutting action of the upper die 41 with its lower die can be adjusted by rotating the actuating rods since they have threaded connection at their ends with their respective parts, and by reason of the endless chain 46 rotation of the rods is uniform so as to maintain the proper horizontal adjustment of the upper die.

The metal sections upon being severed from the strip material by the cutting dies are delivered to the forward delivery end 48 of the machine, which essentially consists of side guides 49 journalling a plurality of rollers such as 50 and 51. The rollers 51 are preferably driven from one of the operating shafts of the machine, the driving instrumentalities including endless chain 52, as shown in Figure 1.

The feeding and cutting machine is driven by an electric motor 53 suitably fixed to base 54, journalled at 55 in uprights 56. At the end of the base opposite the journalling structure thereof an adjustable pin 57 is provided for adjustably supporting this end of the base 54 from the frame member 10. As a result it is possible to vary the position of the motor in a vertical direction so as to maintain proper tension on the endless belts 58, which connect the pulleys 59 on shaft 60 of the motor with pulleys 61 fixed to the intermediate drive shaft 62. Said shaft 62 is suitably journalled by the cylindrical member 63 supported at its outer end by side member 13 and at its inner end by the longitudinal partition 64. Shaft 62 extends through its journalling member to project from the left hand end thereof, which end thus extends beyond side member 13 and receives the pinion 65. Said pinion is in constant meshing relation with the driving gear 66 fixed to the left hand projecting end of the main operating shaft 68. Ball bearing assemblies such as 69 are located at respective ends of the main operating shaft 68 and said bearings journal the shaft in the side members 12 and 13. A pair of eccentrics 70 are fixed to shaft 68, being located within the frame structure and adjacent the ball bearing assemblies, respectively. The eccentrics provide the operating means for actuating rods 45, there being interposed between each rod 45 and its eccentric 70 an annular yoke 71, the same functioning to transmit the eccentric motion caused by rotation of an eccentric 70 to a rod 45, effecting reciprocation of the rods and similar movement of the upper cutting die 41.

A second eccentric, namely, 72, is fixed to the main operating shaft 68 and the same has associated therewith the yoke 73 which in turn has threaded connection with rod 74. Said rod 74 extends diagonally in an upward direction, as best shown in Figure 1, and has pivotal connection at its upper end, as at 75, with the arm 76 provided by collar 77. The collar is fixed to shaft 78 extending through and being journalled by the fixed sleeve 80. The left end of shaft 78, which extends beyond sleeve 80 and thus exteriorly of side member 12, is flattened to form a cam portion 81 for effecting opening and closing action of the jaw-type brake indicated in its entirety by numeral 82. Said brake includes opposed brake arms 83 and 84 pivotally supported at their top end by means of pin 85 having a fixed relation with the brake supporting bracket 86, and said brake arms at their opposite ends being operatively connected by the bolt 87 which retains the coil spring 88 on the right hand side thereof. The action of the coil spring 88 is to close the brake arms 83 and 84, effecting resilient contact with the brake drum 37, thus frictionally braking the lower feed roll to prevent overrun of the strip material. However, the brake arms 83 and 84 are periodically opened following the feeding operation by actuation of cam portion 81, actuation of the same being effected by the eccentric 72 which rotates with the main operating shaft 68. The action of the cam member 81 in opening the brake arms 83 and 84, following the termination of a feed-operation, is such as to maintain the arms in open relation during the return portion of the cycle. In fact, the brake arms are permitted to close under the tension of the spring 88 some time after the feeding operation has begun since their snubbing action is desired only at the end of the feeding operation in order to bring the rotating parts to a gradual stop and prevent any overrun in the feeding of the strip material which might otherwise take place.

Figure 3:
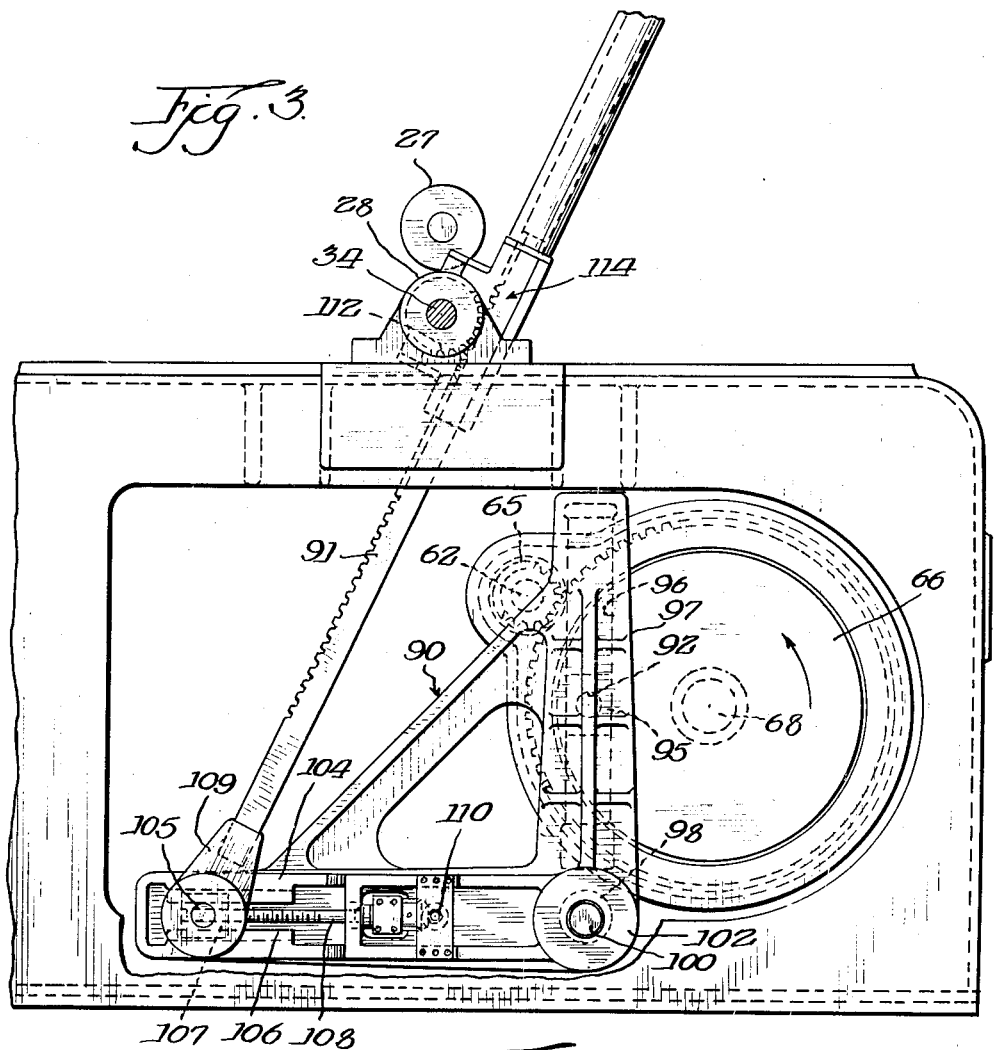
Figure 3 is a fragmentary rear side elevational view showing the driving gear and the oscillating member, the reciprocating rack connecting with said member and with feed rolls which are intermittently driven by said rack.

Referring more particularly to Figures 2 and 3, it will be seen that the drive gear 66 produces oscillating motion of the member 90 and reciprocating motion of rack 91, which in turn intermittently drives the feeding rolls of the present feeding and cutting machine. The stud shaft 92 is suitably fixed to the web portion of drive gear 66 as by means of the reduced end 93 and the securing nut 94. The stud shaft 92 has associated therewith the block 95 which rides within groove 96, provided in the gear arm 97 of the oscillating member 90. In accordance with the invention the oscillating member 90 is journalled for oscillating movement by the eccentric 98 which is provided by shaft 100. The journalling means for said shaft includes the cylindrical member 101 and the end collar 102, the cylindrical member 101 being fixed to and extending through the side member 13 and the end collar 102 being conveniently supported in any suitable manner by the outer side frame 15. The eccentric 98 is accordingly a part of shaft 100, being located intermediate the shaft and integral therewith. The oscillating member 90 has a hub portion 103 suitably apertured for receiving the eccentric 98. Accordingly, it will be understood that the pivot axis of oscillating member 90 is variable, depending on the rotative position of shaft 100.

The rack arm 104 of the oscillating member has pivotal connection as at 105 with the reciprocating rack 91, the said arm being provided at its outer end with the guide-ways 106 within which is mounted the block 107, having threaded connection with stud 108. The pin 105 is carried by block 107 and by means of this pin the hub portion 109 of the rack is pivotally connected to arm 104 of the oscillating member 90, the connection being adjustable to vary the stroke of the rack 91 by rotation of threaded stud 108. By applying a suitable tool to the squared end 110 the threaded stud 108 can be rotated in either direction to adjust the block 107 along the guide-ways 106 and as a result it is possible to vary the magnitude of the reciprocating stroke of rack 91. However, for any particular basic stroke as may be selected it is possible to vary the length thereof by adjusting the rotative position of the shaft 100.

As best shown in Figures 4, 5 and 6, the rack 91 has meshing relation with a pinion 112 having trunnions 113 which support the body portion of the rack and pinion housing 114. The pinion 112 is journalled for free rotation on the left end, Figure 4, of the extending portion of shaft 34, there being interposed between the shaft and said pinion suitable bearings such as 115. The trunnions 113 of the pinion 112 are integral therewith and said trunnions extend on the respective sides of the same. The right hand trunnion is extended by having formed integral therewith the cylindrical casing 116 of the overrunning clutch indicated in its entirety by numeral 118. Said clutch additionally includes the inside element or member 119, the same being keyed as at 120 to shaft 34 so that any rotation imparted to member 119 will be transmitted to the feed roll drive shaft 34. The said member is provided with off-center gripping faces 121 which are reinforced by the hardened steel inserts 122 adapted to support the gripping rollers 123. The rollers are located between the steel inserts 122 and the inside cylindrical gripping surface 124 of the casing 116, and by means of the pins 125, which are backed by the coil springs 126, a one-way clutch is provided whereby only one reciprocating stroke of the rack 91 will be transmitted to the shaft 34. The position of the rack 91 on the right side of the pinion 112, Figure 5, and the particular orientation of the clutch member 119 is such that movement of the rack 91 in a downward direction constitutes an operating stroke producing rotation of the shaft 34 and rotation of the feeding and straightening rolls for a feeding operation. Conversely, reciprocating movement of rack 91 in an upward direction constitutes a non-operative stroke since the clutch releases in this direction. The plate 127 is releasably secured to the clutch casing 116 and said plate completes the clutch structure as it functions to retain the rollers 123 in place, preventing lateral displacement thereof.

The end of shaft 34 projecting beyond the rack and pinion housing 114 extends through a supporting bracket 128 suitably mounted on top wall 11 of the frame structure. Said bracket provides journalling means for this projecting end of shaft 34 and the same accommodates the roller bearing assembly 129 through which the shaft extends. Immediately beyond the roller bearing the shaft has keyed thereto the brake drum 130 which is retained on the shaft by the threaded nut 131. Opposed brake arms 132 and 133 are associated with the drum 130, the arms being pivotally supported by pin 134 and being resiliently connected at their opposite ends by the bolt 135 retaining a coil spring, not shown, which yieldingly closes the brake arms on the drum to apply a constant snubbing action to the feed roll drive shaft 34.

The eccentric shaft 100, see Figure 2, extends through side member 13 and projects from the left hand end of its cylindrical member 101. The said projecting end 136 of reduced diameter has suitably keyed thereto the gear wheel 137 which is located within a housing 138. Said housing in turn journals one end of shaft 140 to which is keyed the worm gear 141 located within housing 138 and having meshing relation with the gear 137. As best shown in Figure 1, said shaft 140 extends longitudinally of the frame structure toward the front wall 19, which provides a housing 142 for journalling the opposite end of said shaft. The sprocket wheel 143, fixed to the end of the shaft located within housing 142, receives the endless chain 144 which also passes over sprocket wheel 145 fixed to shaft 146. Through the bevel gears 147 and 148, Figure 2, the shaft 150 is thus operatively connected to the eccentric shaft 100 and it will be seen that said shaft 150 extends through partition 64 and side member 12, being journalled thereby to project beyond side frame 14, which projecting end is fitted with the hand wheel 151. Operation of the hand wheel 151 will therefore change the rotative position of the shaft 100 and thus the position of eccentric 98. The rotative adjustments that can be given to the eccentric produces variations in the reciprocating strokes of the rack 91 and thus the feeding lengths of the metal sections can be varied. It is possible to make small adjustments in the rotative position of the eccentric 98 and which can be referred to as micrometer adjustments, since variations in the feeding lengths of the metal sections can be held to a thousandth of an inch or they can be altered in increments of one-thousandth of an inch for the adjustable limits of any particular reciprocating stroke.

Figure 8:
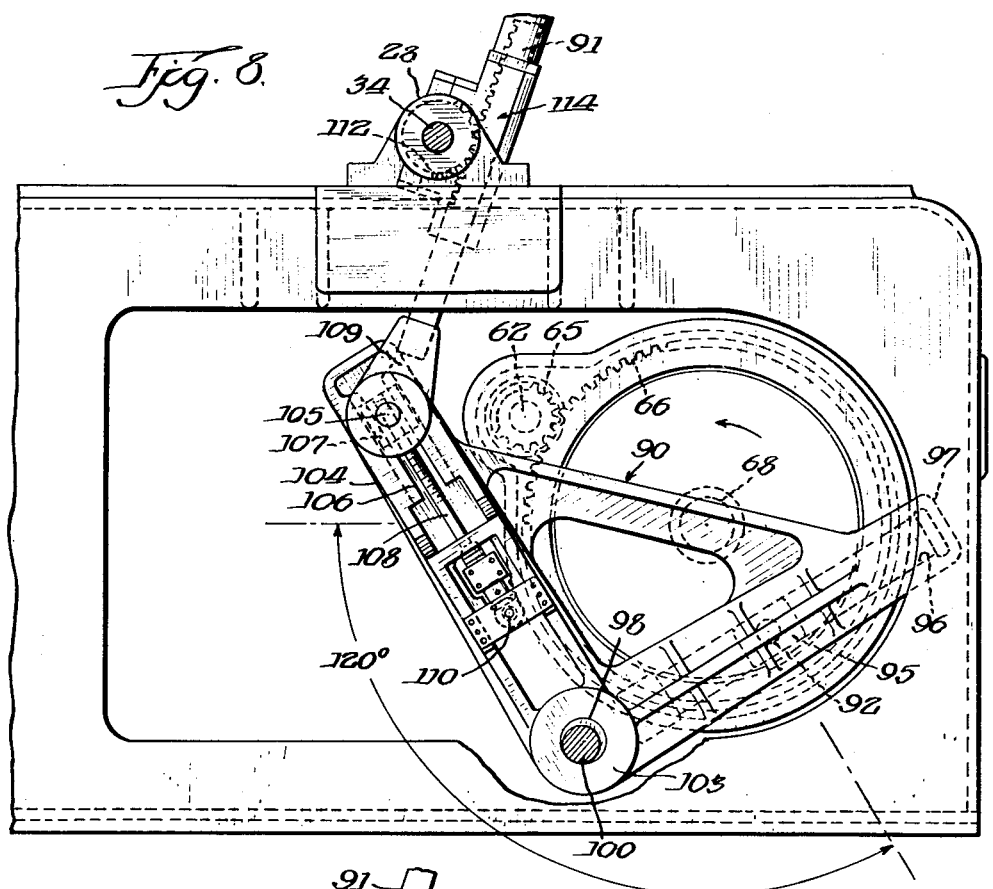
Figure 8 is a view similar to Figure 3 but illustrating two extreme positions of the oscillating member and rack with the eccentric in approximately a mid position.

Figures 3 and 8 show the two extreme positions for the oscillating member and rack for an intermediate adjustment of the eccentric 98 approximately midway between maximum and minimum feeding positions. With the gear 66 rotating in a counterclockwise direction, it will be seen that Figure 3 illustrates the low position of the oscillating member 90 and the rack 91, with Figure 8 showing the same elements in their maximum elevated position. The pin 92, which has circular movement with the rotation of gear 66, effects oscillating movement of the member 90 through the block 95 which is accordingly caused to ride within groove 94 provided therefor in the gear arm 97 of the oscillating member. This upward movement of the rack from the low position of Figure 3 to the elevated position of Figure 8 produces rotation of gear 112 which is counterclockwise, Figures 5 and 6, and thus in a releasing direction as regards the overrunning clutch 118. Accordingly, on the up stroke of rack 91 no rotation is imparted to the feeding rolls 27 and 28 and the strip material gripped by the feeding rolls remains stationary. During rotation of gear 66 from the low position of Figure 3 to the elevated position of Figure 8 the pin 92 will have moved through an arc of approximately one hundred and twenty degrees. This constitutes the quick return heretofore referred to so that the remaining major portion of the cycle, namely, two hundred and forty degrees, constitutes the feeding stroke. However, during the quick return portion while the strip material is stationary, the orientation of the eccentric 70 on the main operating shaft 68 is such as to effect reciprocation of the upper die 41 downwardly into contact with the lower die 42 so that a cutting operation is effected on the strip material, producing a metal section such as 29, Figure 7, of a length corresponding to the basic adjustment given to the rack by the stud 108 plus or minus a small increment determined by the micrometer adjustment given the eccentric 98.

As the operating shaft 68 and gear wheel 66 continue to rotate in a counterclockwise direction, the pin 92, through block 95, will impart reciprocating motion to member 90 in a direction opposite to the movement of this member during the quick return portion of the cycle. Figure 8 accordingly represents the start of a feeding cycle during which the member 90 is reciprocated in a direction toward the left, effecting a downward stroke of the rack 91. Downward movement of said rack produces clockwise rotation of pinion 112 and thus clockwise rotation of casing 116 of the overrunning clutch. For this direction of rotation of the cylindrical casing 116 the overrunning clutch is operative and rotation is imparted to shaft 34 to drive the feeding rolls for a feeding operation on the strip material. It will be understood that the strip material will have clearance as regards the cutting dies during a feeding operation since the cutting dies will have not only completed their cutting operation but will have been returned to their open spaced relation at the start of the feeding stroke. Since the quick return occupied one hundred and twenty degrees of the cycle, the feeding stroke will take place during two hundred and forty degrees, whereupon the parts will assume the position as shown in Figure 3. Since the feeding stroke takes place for the major portion of the cycle, the feeding action is relatively slow. In other words, the feeding action is considerably slower than would otherwise be the case for a one hundred and eighty degree feeding stroke. As a result of the long feeding stroke with quick return as achieved by the present invention, greater accuracy in the feeding action of the feed rolls results.

Rotation of the main operating shaft 68 during the feeding stroke produces rotation of eccentric 72 which is so oriented on said shaft that the cam portion 81 is rotated from a diagonal position to a vertical position, as shown in Figure 1, during the last half portion of the feeding stroke. Thus the friction brake, including the opposed arms 83 and 84, are permitted to close after approximately one-half of the feeding stroke has taken place, and thus, during the terminal half of said stroke the brake is effective to snub the feeding rolls and facilitate the slowing down of the parts, whereby overrun thereof is effectively prevented and a more accurate feeding length is secured.

Figure 9:
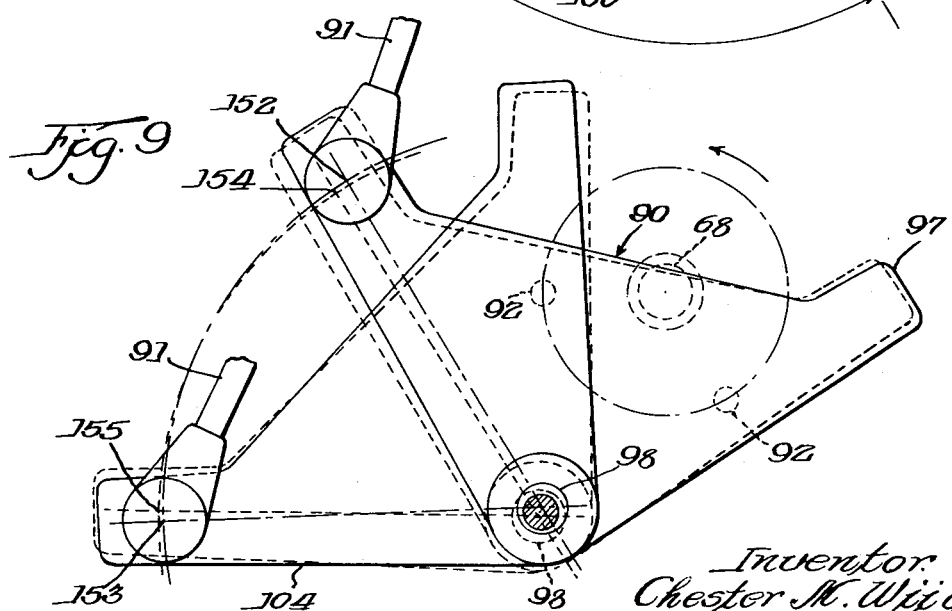
Figure 9 is a diagrammatic view illustrating the basic principles of the present variating device.

In combination with the quick return and long feeding stroke as above explained, the invention provides an adjustable eccentric for the oscillating member 90 which makes possible minute adjustments in the travel of the rack 91 for any particular basic stroke of the rack. This feature of the invention is best illustrated in Figure 9 wherein the solid lines indicate the two extreme positions of the oscillating member and rack for a maximum feed length adjustment of the eccentric 98, with the dotted lines indicating the positions of the said parts for a minimum adjustment of the eccentric. The pin 92 has movement in a fixed circular path. Variations in the oscillating movement of member 90 is effected by changing the pivot axis of said member through adjustment of eccentric 98, it being understood that when the eccentric is located in an up position, that is, toward the main operating shaft 68, the eccentric is adjusted for a maximum feeding length. Conversely, when the eccentric is located in a down position, that is, away from the main operating shaft 68, the adjustment of the same is for a minimum feeding length. Referring again to the full line positions of the oscillating member and rack, it will be seen that the rack will move from an extreme elevated position indicated by numeral 152 to an extreme low position 153 for a feeding stroke, which takes place for two hundred and forty degrees of the complete cycle. With eccentric 98 located for a minimum feed length the dotted line positions of the member and rack show that the movement of the parts between the two extreme positions is considerably less. For example, the point 154 indicates the extreme elevated position of the rack, with point 155 constituting the extreme low position. Although some exaggeration may have been resorted to in Figure 9, nevertheless said figure illustrates diagrammatically the maximum variation in the feeding stroke of the rack which may be effected by adjusting the rotative position of eccentric 98.

The invention is not to be limited to nor by details of construction of the particular embodiment thereof illustrated by the drawings as various other forms of the device will of course be apparent to those skilled in the art without departing from the spirit of the invention or the scope of the claims.

What is claimed is:

1. An intermittent feeding and cutting machine of the class described, in combination, feeding rolls for feeding strip material, a feed roll drive shaft, a pinion gear mounted for rotation on the shaft, a one-way clutch interposed between the pinion gear and the shaft, a reciprocable rack in meshing relation with the pinion gear, an oscillatable member having a rack arm and a gear arm, means providing a pivot connection for pivotally connecting the rack to the rack arm of the oscillatable member, whereby the rack is caused to reciprocate as the member oscillates and whereby as a result of said one-way clutch the rack has operative and inoperative strokes for intermittently rotating the feed rolls, a main drive shaft adapted to rotate constantly during operation of the machine, a drive gear fixed to the main drive shaft, a pin carried by the gear, a block associated with the pin and adapted to slide within a longitudinal groove in the gear arm of the member as the pin rotates in a circular orbit to effect oscillation of the member and thus reciprocating movements of the rack, the said drive shaft, pin, block and oscillating member being so constructed and arranged and having such operation that the inoperative stroke of the rack takes place during approximately 120 degrees of each complete revolution of the drive gear with the operative stroke taking place during the remaining 240 degrees of each revolution, an eccentric journalling the oscillatable member, and means mounting said eccentric for rotative adjustment to constitute a variating device capable of varying the magnitude of the oscillating movements of the member and thus the length of the reciprocating strokes of the rack.

2. An intermittent feeding and cutting machine of the class described, in combination, a feeding roll for feeding strip material, a feed roll drive shaft, a pinion gear mounted for rotation on said shaft, a one-way clutch interposed between the pinion gear and the shaft, a reciprocable rack in meshing relation with the pinion gear, an oscillatable member having a rack arm and a gear arm angularly spaced approximately 90 degrees from each other, means pivotally connecting the rack with the rack arm of the oscillatable member, whereby the rack is caused to reciprocate as the member oscillates and whereby as a result of said one-way clutch the rack has operative and inoperative strokes for intermittently rotating the feed rolls, drive means for the oscillatable member including a main drive shaft adapted to rotate constantly during operation of the machine, a crank pin rotated by the said drive shaft, a block in connected relation with the pin and adapted to slide within a longitudinal groove in the gear arm of the member as the crank pin is caused to rotate in a circular orbit whereby to effect oscillation of the member and thus reciprocating strokes of the rack, said crank pin, block and oscillating member being so constructed and arranged and having such operation that oscillating movement of the member in one direction takes place at a more rapid pace than does oscillating movement of the member in a reverse direction, the base of said member where the gear arm joins with the rack arm having an opening extending therethrough, an eccentric located in said opening for journalling said oscillatable member, and means mounting the eccentric for rotative adjustment whereby to effect variations in the magnitude of the oscillating movements of the member and thus the length of the reciprocating strokes of the rack.

3. An intermittent feeding and cutting machine of the class described, in combination, a feeding roll for feeding strip material, a feed roll drive shaft, a pinion gear mounted for rotation on said shaft, a one-way clutch interposed between the pinion gear and the shaft, a reciprocable rack in meshing relation with the pinion gear, an oscillatable member having a rack arm and a gear arm angularly spaced approximately 90 degrees from each other, means providing a pivot connection for adjustably connecting the rack with the rack arm of the oscillatable member, said means including a block to which the rack is pivoted, said block being mounted for sliding movement in a longitudinal guideway formed in the rack arm, and a threaded stud for adjustably positioning the block, whereby adjustment to change the position of the block will change the basic length of the reciprocating strokes of said rack, drive means for the oscillatable member including a main drive shaft adapted to rotate constantly during operation of the machine, a crank pin rotated by said drive shaft, a block in connected relation with the pin and adapted to slide within a longitudinal groove in the gear arm of the member as the crank pin is caused to rotate in a circular orbit to effect oscillation of the member, the base of said member where the gear arm joins with the rack arm having a transverse opening formed therein, an eccentric located in said opening for journalling the member, and means mounting the eccentric for rotative adjustment whereby to effect minute variations in the magnitude of the oscillating movements of the member and thus similar variations in the basic length of the reciprocating strokes of the rack.

References Cited in the file of this patent

UNITED STATES PATENTS

| | | |
|---|---|---|
| 247,463 | Johnston | Sept. 20, 1881 |
| 1,271,603 | Mortimer | July 9, 1918 |
| 1,732,704 | Wegner | Oct. 22, 1929 |
| 2,262,915 | Bobst | Nov. 18, 1941 |
| 2,315,446 | Miller | Mar. 30, 1943 |
| 2,514,261 | Scheffey | July 4, 1950 |
| 2,541,737 | Bardsley et al. | Feb. 13, 1951 |

FOREIGN PATENTS

| | | |
|---|---|---|
| 419,866 | Great Britain | Sept. 20, 1938 |